Patented Sept. 1, 1964

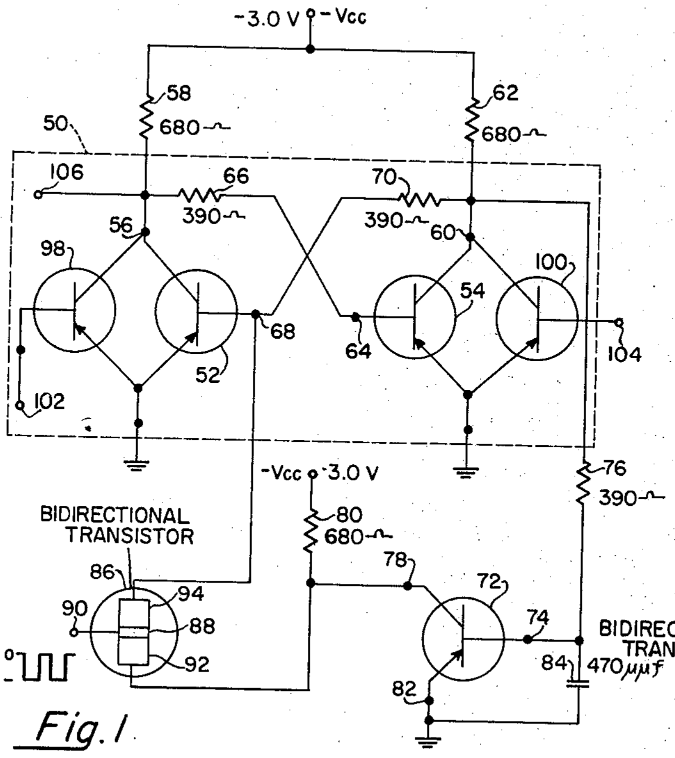
Fig. 1
Fig. 3
| | A | B | C |
|---|---|---|---|
| 1, | 0 | 0 | 0 |
| 2, | 1 | 0 | 1 |
| 3, | 0 | 1 | 1 |
| 4, | 1 | 1 | 0 |
Fig. 4
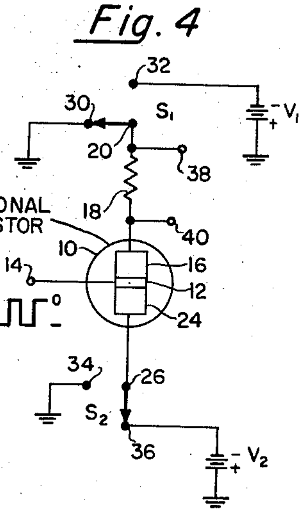
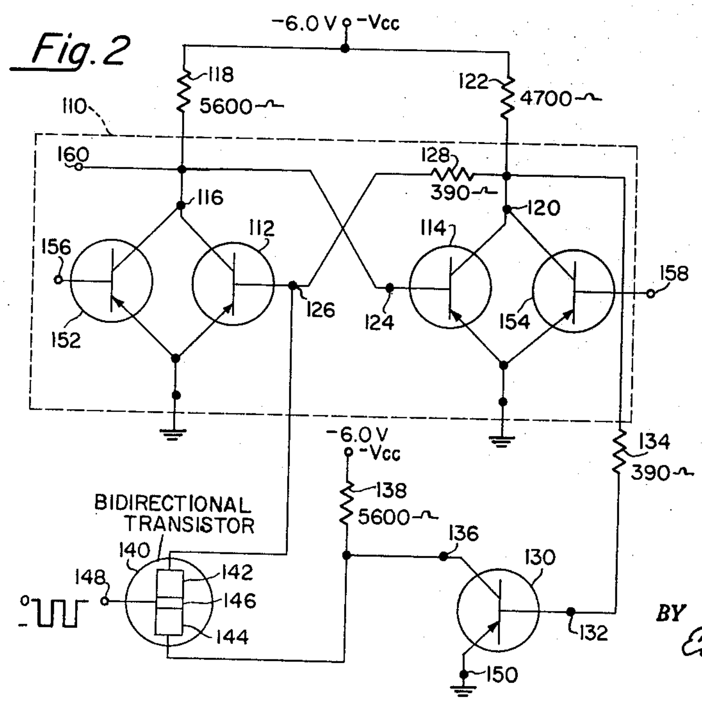
Fig. 2
Fig. 5
| | $S_1$ | $S_2$ | $V_{OUT}$ |
|---|---|---|---|
| 1, | 0 | 0 | 0 |
| 2, | 1 | 0 | -1 |
| 3, | 0 | 1 | +1 |
| 4, | 1 | 1 | 0 |
*INVENTOR.*
EDWARD GARY CLARK
*BY* Edward W. Hughes
ATTORNEY United States Patent Office 3,147,388

3,147,388
COMPLEMENTING FLIP-FLOPS WITH BI-DIRECTIONAL STEERING GATE AND INVERTER TRANSISTOR

Edward Gary Clark, Paoli, Pa., assignor to Burroughs Corporation, Detroit, Mich., a corporation of Michigan Continuation of application Ser. No. 642,845, Feb. 27, 1957. This application Jan. 31, 1962, Ser. No. 172,369
7 Claims. (Cl. 307—88.5)

This application is a continuation of an earlier filed co-pending application entitled Complementing Flip-Flops, Serial No. 642,845, and filed by applicant on February 27, 1957, now abandoned.

This invention relates to complementing flip-flops, and more particularly to complementing flip-flops having improved transitorized steering means.

A flip-flop may be defined as a device having two stable states and two input terminals, or types of input signals, each of which corresponds with one of the two states. The device remains in either state until caused to change to the other state by the application of a corresponding signal. A flip-flop may be changed to a complementing flip-flop, or a binary counter, by the addition of steering means which will apply the proper type of input signal to the flip-flop to cause it to change state in response to each complementing input signal applied to the steering means. The steering means of a complementing flip-flop described and claimed herein use certain unique characteristics of transistors to produce a reliable high frequency complementing flip-flop.

A junction transistor consists of a semiconductive body, for example of germanium or silicon, having an intermediate zone of one conductivity type, N or P, between and contiguous with two outer zones of the opposite conductivity type. Emitter and collector connections are made respectively to the outer zones, and a third connection, the base connection, is made to the intermediate zone. Between the two outer zones and the intermediate zone, or the base, there are defined two junctions, normally referred to as the emitter junction and the collector junction. The collector junction is normally biased in the reverse, or high resistance, direction, and the emitter junction is normally biased in the forward, or low resistance, direction. With the exception in certain types of transistors of the areas of the junctions between the outer zones and the intermediate zones, there is, in general, no physical or electrical characteristic which will identify one outer zone as an emitter and the other outer zone as a collector. There is a functional difference between an outer zone acting as an emitter and an outer zone acting as a collector. However, whether a given outer zone acts as an emitter or as a collector is determined solely by the bias across its junction with the intermediate zone.

The interchangeability of the emitter and the collector of a transistor, which is also referred to as the bidirectional characteristic of a transistor or as the single-unit symmetry of a transistor, is well known. See Proceeding of the IRE, June 1953, pp. 720, 721. The steering means of the complementing flip-flop described and claimed herein use the bidirectional characteristics of transistors to provide a bidirectional steering gate which produces the proper type of signal to cause a noncomplementing flip-flop to change state each time a complementing pulse is applied to the steering gate.

It is, therefore, an object of this invention to provide an improved complementing flip-flop.

It is another object of this invention to provide an improved complementing flip-flop having improved steering means.

It is a further object of this invention to provide a complementing flip-flop having steering means which use the single-unit symmetry characteristics of a transistor.

It is a still further object of this invention to provide a high speed complementing flip-flop having steering means which use the bidirectional characteristics of a transistor.

It is still another object of this invention to provide a high speed and reliable complementing flip-flop which requires a relatively small number of components.

Other objects and many of the attendant advantages of this invention will be readily appreciated as the same become better understood by reference to the following detailed description when considered in connection with the accompanying drawing.

FIG. 1 is a schematic diagram of a complementing flip-flop;

FIG. 2 is a schematic diagram of a second form of a complementing flip-flop;

FIG. 3 is a truth table defining the exclusive-or function;

FIG. 4 is a schematic diagram illustrating the operation of the steering means of the circuits illustrated in FIGS. 1 and 2; and FIG. 5 is a truth table describing the operation of the circuit of FIG. 4.

Before describing and explaining the operation of the complementing flip-flop illustrated in FIGS. 1 and 2, the principles of the operation of a steering gate will be explained in conjunction with FIGS. 3, 4, and 5. In FIG. 4 there is illustrated a bidirectional transistor 10 of the pnp type whose intermediate zone, or base 12, is connected to input terminal 14. Outer zone 16 of bidirectional transistor 10 is connected through resistor 18 to the movable arm 20 of a single-pole double-throw switch $S_1$. The other outer zone 24 is connected to the movable arm 26 of the single-pole double-throw switch $S_2$. Terminal 30 of switch $S_1$ is connected to a point of reference potential, or is grounded, and terminal 32 of switch $S_1$ is connected to a suitable source of negative potential $V_1$, illustrated schematically as a battery. Terminal 34 of switch $S_2$ is grounded, and terminal 36 of switch $S_2$ is connected to a suitable source of negative potential $V_2$, illustrated schematically as a battery. Negative going input pulses are adapted to be applied from a low impedance source to input terminal 14; the magnitude of these pulses is, however, normally less than either $V_1$ or $V_2$. If arm 20 of switch $S_1$ is positioned to contact terminal 30 and if arm 26 of switch $S_2$ is positioned to contact terminal 34, then outer zones 16, 24 of bidirectional transistor 10 are both connected to ground. No transistor action takes place and a negligibly small current will flow through resistor 18 when a negative pulse is applied to input terminal 14, since, despite the fact that both junctions of bidirectional transistor 10 are forwardly biased while the input pulse is applied, the impedance of the path through outer zone 24 to ground is very low compared to that through outer zone 16 in view of the presence of resistor 18. Thus there will be a negligible voltage drop across resistor 18, and the voltage between terminals 38 and 40 will be substantially zero.

If movable arm 20 of switch $S_1$ is connected to terminal 32 and if movable arm 26 of switch $S_2$ is connected to terminal 34, then zone 16 is connected to source $V_1$ and zone 24 is grounded. The junction between zone 16 and base 12 is reverse biased, and the junction between zone 24 and base 12 is forward biased when a negative pulse is applied to terminal 14, so that transistor action takes place, and conventional current will flow through load resistor 18 in such a direction as to make terminal 40 positive with respect to terminal 38. The action of the circuit under the above circumstances is analogous to that of the common emitter.

If arm 20 of switch $S_1$ is connected to terminal 30 and if arm 26 of switch $S_2$ is connected to terminal 36, then the junction between zone 24 and base 12 will be reverse biased and the junction between zone 16 and base 12 will be forward biased when a negative pulse is applied to terminal 14. The application of such a negative pulse under these conditions causes transistor action, and current flows through resistor 18 in such a direction as to cause terminal 40 to be negative with respect to terminal 38. This action of the circuit under these circumstances is analogous to that of an emitter follower.

If arm 20 of switch $S_1$ is connected to terminal 32 and if arm 26 of switch $S_2$ is connected to terminal 36, then zones 16 and 24 are connected to $V_1$ and $V_2$, respectively. When a negative pulse is applied to terminal 14, both junctions of transistor 10 have a reverse bias applied thereto; no transistor action takes place and substantially no current can flow through resistor 18. The voltage between terminals 40 and 38 is substantially zero.

The operation of the circuit of FIG. 4 is described by the truth table of FIG. 5. When arm 20 of switch $S_1$ is positioned so that zone 16 is connected to ground and when arm 26 of switch $S_2$ is positioned so that zone 24 is also connected to ground, then substantially no current will flow through resistor 18, and a substantially zero output voltage is developed across resistor 18 when an input signal is applied to input terminal 14. If ground potential and zero potential are denoted 0, then the operation of the circuit is described by line 1 of FIG. 5.

When arm 20 of switch $S_1$ is positioned so that $V_1$ is connected through resistor 18 to zone 16 and arm 26 of switch $S_2$ is positioned so that zone 24 is connected to ground, then the application of a negative pulse will produce an output voltage across resistor 18. The voltage $V_1$ may be denoted 1, and the output voltage between terminals 38, 40 may be denoted $-1$. Line 2 of FIG. 5 describes the operation of the circuit of FIG. 4 under these circumstances .

When arm 20 of switch $S_1$ is positioned so that zone 16 is connected to ground through resistor 18 and arm 26 of switch $S_2$ is connected so that zone 24 is connected to $V_2$, then current will flow through resistor 18 in the opposite direction to that previously described when a negative pulse is applied at terminal 14. Voltage $V_2$ may be denoted 1, and the output voltage between terminals 38, 40 may be denoted $+1$. The operation of the circuit of FIG. 4 under these circumstances is described in line 3 of FIG. 5.

When arm 20 of switch $S_1$ is positioned so that zone 16 is connected through resistor 18 to $V_1$ and arm 26 of switch $S_2$ is positioned so that zone 24 is connected to $V_2$, then no current will flow through resistor 18 when the input signal is applied at terminal 14. The voltage across resistor 18 will be zero and may be denoted as 0. The operation of the circuit of FIG. 4 under these circumstances is described in line 4 of FIG. 5.

FIG. 3 is a truth table which defines an exclusive-or logic function. The "0's" and "1's" used in FIG. 3 are the binary digits, with those in columns A and B being inputs and those in column C being the result, or outputs. The "0's" and "1's" of FIG. 5 represent voltage ranges, with 0 representing a range of from 0.0 v. to $-0.1$ v. and with 1 representing a range of from substantially $-0.3$ v. to the values of $-V_1$ or $-V_2$. If the voltage ranges denoted 0,1 in FIG. 5 are considered as being the symbolic representation of the binary digits 0, 1, then the bidirectional gate of FIG. 4 is substantially a mechanization of the exclusive-or function.

In FIG. 1 there is disclosed one form of a complementing flip-flop having a bidirectional steering gate. Flip-flop, or bistable device, 50 consists of junction transistors 52, 54, which are cross coupled to form a saturation flip-flop having two stable states. Collector 56 of transistor 52 is connected to a suitable source of collector potential, V*cc*, which is not illustrated, through load resistor 58. Collector 60 of transistor 54 is connected to a suitable source of collector potential V*cc*, which is not illustrated, through load resistor 62. Base 64 of transistor 54 is connected to collector 56 of transistor 52 by base resistor 66. Base 68 of transistor 52 is connected to collector 60 of transistor 54 by base resistor 70. Base 68 also serves as the input terminal for flip-flop 50. Impedance matching transistor 72 has its base 74 connected to collector 60 of transistor 54 through base resistor 76. Collector 78 of transistor 72 is connected to a suitable source of collector potential V*cc*, which is not illustrated, through load resistor 80. Emitter 82 of transistor 72 is grounded, and capacitor 84 is connected between base 74 and emitter 82 for reasons which will be pointed out subsequently.

Bidirectional transistor 86 has its intermediate zone, or base, 88 connected to input terminal 90 of the complementing flip-flop. Outer zone 92 of transistor 86 is connected to collector 78 of transistor 72, and outer zone 94 of transistor 86 is connected to base 68 of transistor 52, the input terminal of flip-flop 50. Bidirectional transistor 86, transistor 72, and associated circuitry form the steering gate of the complementing flip-flop.

It is possible to design circuits using pnp junction transistors of the grown, alloy, or surface barrier types; i.e., in the common emitter configuration, so that the transitsors of such circuits will saturate if the potentials of their bases with respect to their emitters, which are generally at ground potential, are more negative than $-0.3$ v. and so that the transistors will be substantially biased off if the potentials of their bases with respect to their emitters are approximately $-0.1$ v., or more positive. These voltages obviously may vary depending on the characteristics of the transistors used, as is well known in the art. In such circuits the potential of the collector of a bottomed, saturated, or heavily conducting transistor will be approximately $-0.1$ v., or more positive, or approximately at ground potential, which potential, when applied to the base of a transistor in a similar configuration, is sufficient to cut off the transistor. The voltage drop between the emitter and the collector of a saturated transistor is normally no more than 0.1 v. The devices described and illustrated as examples of embodiments of the invention use transistor circuits having substantially such operating characteristics.

If it is assumed initially that transistor 52 is cut off, then the potential of its collector 56 will be negative. Since base 64 of transistor 52 is connected through base resistor 66 to collector 56, base 64 will be sufficiently negative to cause transistor 54 to saturate which raises collector 60 substantially to ground potential. The potential of collector 60 is applied through base resistor 70 to base 68 and maintains transistor 52 cut off. Since collector 60 of transistor 54 is connected to base 74 of transistor 72, the potential of collector 60 under the initial conditions; i.e., ground potential, maintains transistor 72 cut off; and as a result, its collector 78 is negative. Since outer zone 92 of bidirectional transistor 86 is connected to collector 78 of transistor 72, zone 92 will also be at a negative potential. Outer zone 94 of bidirectional transistor 86 will be at the same potential as base 68 of transistor 52 since it is directly connected to it. Under the initial conditions zone 94 will be substantially at ground potential.

When a negative going complementing pulse is applied to base 88 of bidirectional transistor 86, it conducts. Conventional electric current then flows through base resistor 70, and the potential of base 68 becomes negative and substantially equal to the amplitude of the complementing pulse applied to terminal 90. This change of potential of base 68 is sufficient to cause transistor 52 to conduct heavily. When transistor 52 is conducting heavily, or saturated, the potential of its collector 56 becomes more positive, substantially reaching ground potential. The ground potential of collector 56 of transistor 52 raises the potential of base 64 of transistor 54 to ground level, cutting off transistor 54. The collector of transistor 54 then becomes negative and maintains base 68 sufficiently negative to keep transistor 52 conducting heavily, and flip-flop 50 has changed to its second, or other, state.

When transistor 54 cuts off, the potential of its collector 60 becomes negative, and this causes the potential of base 74 of transistor 72 to become sufficiently negative to bottom transistor 72. When transistor 72 is saturated, its collector 78 rises substantially to ground potential. Thus zone 92 of bidirectional transistor 86 is at ground potential and zone 94 is at a negative potential since base 68 of transistor 52 is negative.

If the initial complementing pulse is still applied, or present, when the steering gate reverses, or changes from its initial condition, where its initial condition exists when zone 94 is substantially at ground potential and zone 92 is at a negative potential, to its second condition, which exists when zone 94 is at a negative potential and zone 92 is substantially at ground potential, then flip-flop 50 will again change its state and return to its initial state. Each complementing input pulse applied to terminal 90 has a given width, the period of time the complementing pulse is present or applied. If the condition of the steering gate reverses while the complementing pulse, which is responsible for the reversal of the steering gate, is still present, then a phenomenon known as time race occurs. When time race occurs, a complementing input pulse causes the flip-flop to change state repeatedly, or oscillate, as long as the complementing input pulse is present. The final state of the complementing flip-flop will then be a function of the pulse width of each complementing input pulse. In order to prevent time race, the integrating circuit comprised of base resistor 76 and capacitor 84 is used to provide a substantially constant period of delay between the time, for example, when transistor 54 cuts off and transistor 72 bottoms. Then to prevent time race, the width of each complementing input pulse applied to input terminal 90 must be equal to or less than the period of delay provided by the integrating circuit.

When the next, or second, complementing input pulse is applied to input terminal 90, bidirectional transistor 86 conducts and current flows through base resistor 70 in such a direction as to cause the potential of base 68 of transistor 52 to become more positive until it is at substantially ground potential. This cuts off transistor 52. When transistor 52 cuts off, the potential of its collector 56 becomes negative, which in turn causes transistor 54 to bottom; and flip-flop 50 has returned to its initial state. When transistor 54 bottoms, the potential of collector 60 of transistor 54 changes to ground level. The integrating circuit comprised of base resistor 76 and capacitor 84 delays the change of potential of base 74 of transistor 72 for a period determined by the time constant of the integrating circuit. After this delay, base 74 becomes sufficiently positive so that it is substantially at ground potential, which cuts off transistor 72, and collector 78 then becomes negative. The complementing flip-flop has now returned to its initially defined condition, and a complete cycle of operation has been described.

In FIG. 1 transistor 54 may be considered as corresponding to switch $S_1$ in FIG. 4, base resistor 70 as corresponding to resistor 18, bidirectional transistor 86 as corresponding to bidirectional transistor 10, and transistor 72 as corresponding to switch $S_2$. The potential of collector 60 of transistor 54 is substantially at ground potential when the steering gate is in one condition and is at a negative potential when the steering gate is in its other, or second, condition. The potential of collector 78 of transistor 72 is at a negative potential when the steering gate is in its first condition and is substantially at ground potential when the steering gate is in its second condition. The potential of base 68 of transistor 52, the input terminal of flip-flop 50, may have two values, substantially zero or ground potential, and a negative potential which is determined by the magnitude of the collector supply potential $Vcc$ and the voltage drop across resistors 62, 70 and 76 determined by the base current of transistors 52 and 72 when bottomed. The potential of collector 78 of transistor 72 likewise has two values, one being substantially zero or ground potential, and the other being a negative potential determined by $Vcc$ and by the voltage drop across resistor 80. Thus, the bidirectional steering gate illustrated in FIG. 1 is comparable to that illustrated in FIG. 4, and the operation of steering gate of FIG. 1 is described by lines 2 and 3 of FIG. 5.

The action of the steering gate in FIG. 1 in either of its two conditions is to change the potential of base 68, the input terminal of flip-flop 50, from its value prior to the application of a complementing pulse to the steering gate to its other possible value as the result of the application of the complementing pulse to the steering gate. The change of potential of input terminal 68 causes flip-flop 50 to change state. Then the condition of the steering gate is reversed after a period of delay as a consequence of the change of state of the flip-flop.

In the binary system, the complement of a zero is a one and the complement of a one is a zero. The function of the steering gate of a complementing flip-flop is, in response to each complementing pulse applied thereto, to change the potential of the input terminal of the flip-flop from a potential which may be denoted 0 to a potential which may be denoted 1, or from a potential denoted 1 to a potential denoted 0. Thus the function of the steering gate may be described as complementing the potential of the input terminal of a flip-flop, and the bidirectional steering gate may be described as being an exclusive-or complementor.

Transistor 98 is connected in parallel with transistor 52, and transistor 100 is connected in parallel with transistor 54. The application of a sufficiently large negative pulse to set terminal 102, which is connected to the base of transistor 98, will cause flip-flop 50 to assume a stable state in which collector 56 of transistor 52 is substantially at ground potential. The application of such a negative pulse to reset terminal 104, which is connected to the base of transistor 102, will cause flip-flop 50 to assume a stable state in which the potential of collector 60 of transistor 54 is substantially at ground level. The state of flip-flop 50 may be determined by, or the output signal of the complementing flip-flop may be taken from, terminal 106, which is connected to collector 56 of transistor 52.

In FIG. 2 there is disclosed a second embodiment of a complementing flip-flop having a bidirectional steering gate. Flip-flop, or bistable device, 110 is comprised of transistors 112, 114, which are cross coupled to form a saturation flip-flop having two distinguishable stable states. Collector 116 of transistor 112 is connected through load resistor 118 to a suitable source of collector potential, $Vcc$, which is not illustrated. Collector 120 of transistor 114 is connected through load resistor 122 to a suitable source of collector potential $Vcc$, which is not illustrated.

Base 124 of transistor 114 is directly connected to collector 116 of transistor 112. Base 126 of transistor 112, which also serves as the input terminal of flip-flop 110, is connected through base resistor 128 to collector 120 of transistor 114. Impedance matching transistor 130 has its base 132 connected to collector 120 of transistor 114 through base resistor 134. Collector 136 of transistor 130 is connected through load resistor 138 to a suitable source of collector potential Vcc, which is not illustrated. Bidirectional transistor 140 has its outer zone 142 connected directly to base 126 of transistor 112, and its other outer zone 144 is directly connected to collector 136 of transistor 130. Intermediate zone, or base, 146 of transistor 140 is connected to input terminal 148 of the complementing flip-flop, which is adapted to have negative going complementing input pulses applied to it. Emitter 150 of transistor 130 is connected to ground.

If it is assumed initially that transistor 112 is cut off, then the potential of its collector 116 will be negative, which potential is applied to base 124 and causes transistor 114 to bottom. Collector 120 of transistor 114 is then substantially at ground potential. The potential of collector 120 is applied through base resistor 128 to base 126 of transistor 112, which maintains transistor 112 cut off and collector 116 at a negative potential. Collector 120 is also connected to base 132 of transistor 130, which cuts off transistor 130; and as a result, the potential of its collector 136 is also negative. Thus initially the condition of the steering gate is that outer zone 142 is substantially at ground potential, and outer zone 144 is at a negative potential.

When a negative going complementing pulse is applied to terminal 148, bidirectional transistor 140 conducts, and current flows through base resistor 128 in such a direction as to lower the potential of base 126 of transistor 112, the input terminal of flip-flop 110, so that it substantially equals the magnitude of the complementing pulse applied to terminal 148. This bottom transistor 112, raising the potential level of its collector 116 substantially to ground potential. The potential of collector 116 is applied to base 124, cutting off transistor 114. The potential of collector 120 of transistor 114 then becomes negative, which potential is applied to base 126 of transistor 112, maintaining transistor 112 in its bottomed condition. Since collector 120 is also connected to base 132 of transistor 130, transistor 130 bottoms. When transistor 130 bottoms, its collector 136 rises substantially to ground potential. The steering gate is now in its second condition with zone 144 substantially at ground potential and with zone 142 at a negative potential.

When the next, or second, complementing pulse is applied to base 146 of bidirectional transistor 140, it conducts with current flowing through base resistor 128 in such a direction as to cause the potential of input terminal 126 to become more positive, reaching substantially ground potential, which cuts off transistor 112. When transistor 112 cuts off, the potential of its collector 116 becomes negative, which causes transistor 114 to bottom; and flip-flop 110 has changed state. The potential of collector 120 is then substantially at ground potential, which potential is applied through base resistor 134 to base 132 of transistor 130. This cuts off transistor 130 so that the potential of its collector 136 becomes negative. The complementing flip-flop has thus returned to its initial condition and has completed a cycle of operation. The operation of the bidirectional steering gate which is comprised of bidirectional transistor 140, transistor 130, and associated circuitry, is substantially the same as the steering gate of the circuit of FIG. 1, as described above.

The complementing flip-flop of FIG. 2 does not have incorporated in it an integrating circuit such as that used in the circuit of FIG. 1 to delay the reversal of the condition of the steering gate for a substantially predetermined period of time. In order to avoid time race, advantage is taken of the charge carrier-storage delay of transistors 112, 114, and 130 to provide a period of delay.

Transistor 152 is connected in parallel with transistor 112, and transistor 154 is connected in parallel with transistor 114. The application of a sufficiently large negative pulse to set terminal 156, which is connected to the base of transistor 152, will cause flip-flop 110 to assume a stable state in which the potential of collector 116 of transistor 112 is substantially at ground potential. The application of a negative pulse to reset terminal 158, which is connected to the base of transistor 154, will cause flip-flop 110 to assume a stable state in which collector 120 of transistor 114 is substantially at ground potential. The state of flip-flop 110 may be determined by, or the output signal of the complementing flip-flop may be obtained from, terminal 160, which is connected to collector 116 of transistor 112.

Transistors used in the circuit illustrated in FIG. 1 are SB–100's. In such transistors the area of the junction defined by the manufacturer as the emitter junction is substantially less than the area of the collector junction. The reason for the difference between the junction areas is to increase $\beta$, the current-gain characteristic of a transistor. Because of the dissimilar junction areas, the operating characteristics of such transistors are not symmetrical; however, this does not present a serious problem when a transistor having asymmetrical characteristics is used for a bidirectional transistor, since it is operated either saturated, or cut off, or conducting in the emitter-follower mode where the current gain is not critical. When a transistor having asymmetical characteristics is used for the bidirectional transistor, it is preferable to connect the outer zone having the larger junction area, normally the collector, to the input terminal of the flip-flop. This connection is preferable because the reduced gain of the bidirectional transistor, when operating in the emitter-follower mode, as compared with its greater gain when operated in the common emitter mode, has no significant effect because of the highly degenerative characteristic of an emitter follower. A complementing flip-flop having component values, as indicated in FIG. 1, using SB–100 transistors, has a maximum pulse repetition frequency of substantially 4.0 megacycles per second.

Transistors used in the embodiment of the circuit of FIG. 2 are all SB–100's except bidirectional transistor 140 which is a surface barrier type in which the emitter-collector junctions are substantially equal in area, with the result that the operating characteristics are symmetric. When using a symmetrical transistor for the bidirectional transistor and with component values as indicated on FIG. 2, the maximum pulse repetition frequency of the complementing flip-flop is of the order of 12.0 megacycles per second. The higher frequency is due primarily to the use of the hole storage of transistors 112, 114, and 130 to provide delay and by reducing the magnitude of the hole storage by the proper choice of operating conditions of the circuit. Because of the short period of delay, the width of the complementing pulses applied to terminal 148 must be very narrow.

In the example of the embodiments of the invention illustrated in FIGS. 1 and 2, all the transistors have been illustrated and described as being pnp transistors. As is well known in the art, npn transistors may be substituted for pnp transistors provided the polarity of the supply voltages and the polarity of the triggering signals are reversed.

The values and/or types of components and the voltages appearing on the drawings are included, by way of example only, as being suitable for the devices illustrated. It is to be understood that circuit specifications in accordance with the invention may vary with the design for any particular application.

Obviously, many modifications and variations of the present invention are possible in the light of the above teachings. It is, therefore, to be understood that within the scope of the appended claims, the invention may be practiced other than as specifically described and illustrated.

I claim:

1. A transistor flip-flop circuit adapted to be shifted from either of its stable operating states to the other in response to each of successive triggering signals of the same polarity, said flip-flop circuit comprising a pair of cross-coupled transistors each having an input electrode and an output electrode, direct-current means connecting the input electrode of each transistor to the output electrode of the other, and impedance means for connecting each output electrode to a source of operating potential, said output electrodes assuming one or the other of two different potentials according to the state of the flip flop; a third transistor having an inner zone of one conductivity type and two outer zones of the other conductivity type and having junctions between the outer and inner zones; direct-current means connecting the output electrode of one of said flip-flop transistors to one outer zone of said third transistor; means for applying to the other outer zone of said third transistor a potential corresponding substantially to that at the output electrode of the other of said flip-flop transistors, said last-mentioned means comprising an impedance-matching inverter transistor having an input electrode connected by direct-current means to the output electrode of said one flip-flop transistor and having an output electrode connected directly to said other outer zone of said third transistor, said output electrode of said inverter transistor also being connected through impedance means to said source of operating potential, the circuit parameters being such that the potential at the output electrode of said inverter transistor corresponds substantially to the potential at the output electrode of said other of said flip-flop transistors; and means for applying successive triggering pulses of the same polarity to the inner zone of said third transistor to effect shifting of the state of said flip-flop circuit in response to each applied triggering pulse.

2. A complementing flip-flop circuit adapted to be shifted from one stable state to the other in response to each of successive input pulses of like polarity, said circuit comprising, in combination, a pair of cross-coupled semiconductor devices of similar conductivity type forming the flip-flop, each of said devices having an input electrode connected to an output electrode of the other device, each output electrode assuming one or the other of two potentials according to the state of the flip-flop; a third semiconductor trigger device having an inner zone of one conductivity type and two outer zones of the opposite conductivity type; circuit means intercoupling each of the outer zones of said trigger device to an output electrode of one of the cross-coupled devices such that one outer zone receives a bias potential corresponding to that at the output electrode of one of said cross-coupled devices and the other outer zone receives a bias potential corresponding to that at the output electrode of the other of said cross-coupled devices; said intercoupling means comprising a direct-current connection from one of said outer zones to an output electrode of one of said cross-coupled devices and an inverter coupling the other of said outer zones to said same output electrode of said same one of said cross-coupled devices; and means for applying input pulses of like polarity successively to the inner zone of said trigger device to cause the state of said flip-flop to change in response to each applied input pulse.

3. A bi-stable circuit comprising a bi-stable device operative to provide an output voltage having a first potential when said bi-stable device is in one state and having a second potential when said bi-stable device is in its other state, a first transistor having an inner zone of one conductivity type and two outer zones of the other conductivity type and having junctions between the outer and inner zones, direct current means connecting one outer zone of said first transistor to said output voltage, and connecting means responsive to the state of said bi-stable device for connecting the other outer zone of said first transistor to a voltage substantially equal to the other of said first and second potentials from that connected to said one outer zone, said connecting means comprising a second transistor connected between said bi-stable device and said first transistor for providing a time delay to said output voltage coupled through said connecting means to said first transistor.

4. A bi-stable circuit comprising a bi-stable device having an output terminal and operative to produce at said terminal a first output voltage when in one state and a second output voltage when in another state, a first transistor having an inner zone of one conductivity type and two outer zones of the other conductivity type and having junctions between said outer and inner zones, direct current means connecting one of said outer zones to said output terminal, connecting means for connecting the other outer zone to a potential substantially equal to the other of said first and second voltages from that present at said output terminal, said connecting means comprising an inverter transistor and an integrating circuit connected between said bi-stable device and said first transistor, and means for supplying to the inner zone of said transistor successive pulses of the same polarity, whereby the state of the bi-stable device is successively shifted.

5. A bi-stable circuit adapted to be shifted from either of two stable operating states to the other such state in response to each of successive triggering pulses of one polarity, said circuit comprising a bi-stable device having an input and an output and settable to one or the other of its stable states in response to the polarity of pulses presented to said input, said output being either a first or a second signal corresponding to the state of said bi-stable device, a junction transistor having first and second junctions, connecting means connected to said bi-stable device for biasing said first junction in a forward direction and said second junction in a reverse direction in response to said bi-stable device being in one state, and for biasing said first junction in a reverse direction and said second junction in a forward direction in response to said bi-stable device being in its other state; said connecting means comprising an amplifier and a delay circuit connected between said bi-stable device and said transistor, and a source of pulses of the same polarity connected to the base of said transistor to cause said transistor to conduct in one direction or the other in accordance with the directions in which said junctions are biased and thereby shift the state of said bi-stable device from one state to the other.

6. A bi-stable circuit comprising a bi-stable device having an input terminal and an output terminal and responsive to successive pulses applied to said input terminal to alternately change its state, an integrating circuit and a steering transistor connected in series between said input terminal and said output terminal, said steering transistor being biased for conduction in one direction or the other in accordance with the state of said bi-stable device; said steering transistor having two outer zones of one conductivity type and an inner zone of the other conductivity type, one of said outer zones being connected to said integrating circuit, a source for providing pulses of one polarity being connected to said inner zone, and said other outer zone being connected by direct current means to said input terminal to supply a pulse of one polarity or the other to said input terminal in response to a pulse from said source in accordance with the direction of biasing of said steering transistor.

7. A bi-stable circuit adapted to be shifted from either of two stable operating states to the other such state in response to each of successive triggering pulses of the same polarity, said circuit comprising a bi-stable device having an input and an output, a bi-directional transistor having two outer zones of one conductivity type and an inner zone of the other conductivity type, direct current means coupling one of said outer zones to the input of said bi-stable device, and delay circuit means connecting the output of said bi-stable device to the other outer zone of said bi-directional transistor whereby said bi-directional transistor is biased for conduction in a direction corresponding to the state of said bi-stable device, said delay circuit tending to resist a rapid change in the amount of bias on said bi-directional transistor upon shifting the state of said bi-stable device, and pulse generating means for supplying pulses of one polarity to the inner zone of said bi-directional transistor to shift the state of the flip-flop in accordance with the direction of conduction of said bi-directional transistor.

References Cited in the file of this patent

UNITED STATES PATENTS

| | | |
|---|---|---|
| 2,885,574 | Roesch | May 5, 1959 |
| 2,909,678 | Jensen | Oct. 20, 1959 |
| 2,965,768 | Wanlass | Dec. 20, 1960 |
| 3,028,506 | Logue et al. | Apr. 3, 1962 |